United States Patent [19]

Gadsby et al.

[11] 4,341,806

[45] Jul. 27, 1982

[54] METHOD OF HEATING AND FREEZING A TEXTURIZED MYCELIAL FUNGAL MASS

[75] Inventors: Bruce Gadsby; Kate A. Simmons, both of High Wycombe, England

[73] Assignee: E. I. Du Pont de Nemours and Company, Wilmington, Del.

[21] Appl. No.: 292,804

[22] Filed: Aug. 14, 1981

Related U.S. Application Data

[63] Continuation-in-part of Ser. No. 116,666, Jan. 29, 1980, abandoned, which is a continuation-in-part of Ser. No. 2,708, Jan. 10, 1979, abandoned, which is a continuation-in-part of Ser. No. 872,081, Jan. 25, 1978, abandoned.

[30] Foreign Application Priority Data

Jan. 25, 1977 [GB] United Kingdom ............... 2959/77

[51] Int. Cl.$^3$ .............................................. A23J 3/00
[52] U.S. Cl. .................................. 426/511; 426/524; 426/656; 426/802
[58] Field of Search ............... 426/104, 574, 656, 657, 426/511, 520, 524, 802; 435/254, 911

[56] References Cited

U.S. PATENT DOCUMENTS

| | | | |
|---|---|---|---|
| 3,775,393 | 1/1973 | Akin et al. | 260/112 R |
| 3,809,776 | 5/1974 | Chao | 426/431 |
| 3,914,457 | 10/1975 | Nagel | 426/589 |
| 3,920,853 | 11/1975 | Middendorf et al. | 426/104 |
| 3,939,284 | 2/1976 | Akin et al. | 426/250 |
| 3,968,009 | 7/1976 | Tannenbaum et al. | 435/270 |
| 4,001,459 | 1/1977 | Kim et al. | 426/656 |
| 4,018,903 | 4/1977 | Segeren et al. | 426/520 |
| 4,056,638 | 11/1977 | Huang et al. | 426/244 |
| 4,073,962 | 2/1978 | Spata et al. | 426/250 |
| 4,107,334 | 8/1978 | Jolly | 426/7 |

FOREIGN PATENT DOCUMENTS 1502455  3/1978  United Kingdom .
1508635  4/1978  United Kingdom .

*Primary Examiner*—Arthur L. Corbin

[57] ABSTRACT

A process of steaming followed by freezing a texturized mycelial fungal mass having a solids content of about 20 to 40% by weight to toughen the texture and increase the succulence of the mass.

5 Claims, No Drawings

METHOD OF HEATING AND FREEZING A TEXTURIZED MYCELIAL FUNGAL MASS

CROSS-REFERENCE TO RELATED APPLICATIONS

This application is a continuation-in-part of U.S. application Ser. No. 116,666, filed on Jan. 29, 1980, now abandoned, which in turn is a continuation-in-part of U.S. application Ser. No. 002,708, filed Jan. 10, 1979, now abandoned, which in turn is a continuation-in-part of U.S. application Ser. No. 872,081, filed Jan. 25, 1978, now abandoned.

BACKGROUND OF THE INVENTION

This invention relates to a method of texturizing a proteinaceous substance, particularly a mycelial fungal mass.

Mycelial fungi produced under controlled conditions can be suitable for use as a foodstuff for humans and may be desirably texturized so as to resemble the appearance of natural meat to make it more acceptable as a foodstuff. Texturizing techniques are disclosed in co-pending British Patent Applications Nos. 25385/75 and 25387/75.

A portion of British Patent Application No. 25385/75 now British Pat. No. 1,508,635 reads as follows:

"According to the present invention there is provided a method of texturizing a mycelial fungal mass having reduced turgor and a solids content of between 20% and 35% by weight, which includes passing the mass under pressure through at least one apertured member whereby the mass is filamented and compacting said filaments to form a textured structure. Preferably the mass is passed in succession through a plurality of meshes each having a different mesh size.

The invention also includes apparatus for texturizing a mycelial fungal mass having reduced turgor and a solids content of between 20% and 35% by weight, which includes means for feeding the mass to a die, at least one mesh size within the range of 0.3 to 2.0 mm within the die through which the mass is passed to effect filamenting of the mass and compacting means for reducing the cross-sectional size of the filamented mass to produce a textured structure.

Conveniently, the feeding means may include a screw-type positive displacement pump located within a housing attached to a die and operated at ambient temperature. The die may incorporate two mesh structures, the first mesh structure being of a fine nature and the second mesh structure being of a more coarse nature and a compacting head, having an internal taper, attached near to the outlet from the second mesh structure."

A portion of British Patent Application No. 25387/75 now British Pat. No. 1,502,455 reads as follows:

"According to the present invention there is provided a method of texturizing a mycelial fungal mass having reduced turgor and a solids content of between 20% and 40% by weight, which includes rolling the mass between two relatively moving surfaces to elongate the mass into a cylinder in which groups of hyphae are attenuated and entangled to a substantial extent to give a textured structure.

The invention also includes a method of texturizing a mycelial fungal mass having reduced turgor and a solids content of between 20% and 40% by weight, which includes rolling of the mass between two relatively moving surfaces to form an elongate cylinder, juxtaposing at least two sections of the cylinder to form a tiered mass, repeat rolling the tiered mass to form a further elongate cylinder, juxtaposing at least two sections of the further cylinder and successively repeating the procedure finishing with a rolling step to give a textured structure.

The invention also includes apparatus for texturizing a mycelial fungal mass having reduced turgor and a solids content of between 20% and 40% by weight, which includes a stationary base and a movable endless belt spaced therefrom defining two relatively movable surfaces, said surfaces converging in the direction of movement such that the said mass is moved in when placed in contact with both said surfaces so as to form an elongate cylinder of said mass, and means located at the downstream end of said surfaces for manipulating said cylinder to form a tiered mass for further elongation into a textured structure."

If texturized in accordance with Application No. 25385/75, the mass will have a solids content of beteen 20% and 35% by weight and if texturized in accordance with Application No. 25387/75 the mass will have a solids content of between 20% and 40% by weight. In either case, the average solids content will be approximately 30% by weight and the average water content will be approximately 70% by weight. The free water in the mass may range from 30% by 57% and the bound water from 3% to 25% depending on the condition of the mycelial fungi. On average, the free water will be approximately 54% by weight and the bound water approximately 16% by weight.

In this Specification, "free water" is defined as the percent of the total wet sample which is freezable as measured by differential scanning calorimetry and "bound water" is defined as the difference between the total water and the free water.

U.S. Pat. No. 4,056,638 issued to Huang et al discloses a process for heating and drying a fungal material comprising treating the same by rapid dielectric heating to reduce the moisture content from 8 to 40 weight percent to give a produce with a solids level of 30 to 70 weight percent. The patent discloses that dielectric heating puffs and heat sets the material which can then be further dried at a much slower rate by conventional means such as hot air. The resulting product can be rehydrated to absorb from 1 to 5 times its weight of water. The patent stresses the difference between its dielectric heating step and conventional drying means.

U.S. Pat. No. 4,001,459 issued to Kim et al discloses a method of preparing a texturized protein material comprising freezing an aqueous mixture of a heat coagulable protein by cooling the mixture in a manner and at a rate effective to produce elongated ice crystals generally aligned perpendicular to the surface of cooling, freeze-drying the frozen mass, and heat-setting the resulting dried protein material. The list of usable protein materials given in the patent includes single-cell protein. The heat-setting can be done by the use of moist heat.

It is an object of the present invention to progress further in the texturization process of the mycelial fungal mass starting from a texturization technique disclosed as the above-mentioned British Patent Applications, although it should be appreciated that other initial texturization techniques may be employed.

SUMMARY OF THE INVENTION

According to the present invention there is provided a method of improving the toughness and increasing the succulence of a texturized mycelial fungal mass having a macrofiber structure similar to the fibers of natural meat and having a solids content of from about 20 to about 40% by weight, the solids content of which consists essentially of fungal mycelia, comprises carrying out the following steps in the order specified:
(a) heating the texturized mass in an atmosphere of substantially saturated steam for a period of from 1 minute to 2½ hours so that the entire mass is at a temperature of at least 90° C. to reduce bound water by about 4% by weight and increase free water of the mass by about 4%; and
(b) freezing the texturized mass slowly at a rate of about 0.5° C. per minute to a temperature between −10° C. and −40° C.;
said method being conducted so as to maintain the solids content of the fungal mass at its initial level of from about 20 to about 40% by weight.

DETAILED DESCRIPTION OF THE INVENTION

A mycelial fungal mass is blended with suitable additives such as egg albumen, gluten, soya isolate, soya concentrate, whole egg, cellulose, starch, fats, emulsifiers, foaming agents and gums, and texturized to impart to the mass a macrofiber structure in the order of the fibers of natural meat. This initial texturizing step may be carried out by using one or both of the methods disclosed in the above-mentioned British Patent Applications or any other suitable method. The mass, after the initial texturization step, will consist of a plurality of substanitally parallel macrofibers, each consisting of a mass of hyphae aligned substantially in the direction of the macrofibers.

During the mixing and the initial mechanical texturizing step, the additives absorb water in the cold. Bound water in the mass increases from about 12% by 17% and free water falls from about 55% to 50% without a change in solids. Thus, the bound water content of the mass increases about 5% while the free water content of the mass falls about 5% during the heating step.

The material, after having been initially texturized, can then be cut into chunks directly or alternatively slabs can be formed by placing several texturized blocks, cut to 2 to 6 inch lengths, side by side and pressing these into slabs using a suitable press giving a pressure in the order of 10 to 30 psi although pressures up to 100 psi can be suitable. When the blocks are placed side by side they should be orientated with the macrofibers lying substantially parallel.

The mass is then heated in a saturated steam atmosphere at 0 to 15 psi from one minute to 150 minutes depending on the thickness of the slabs. The heating must be such that the temperature of the entire mass is at least 90° C. The mass is preferably heated in a saturated stream atmosphere at atmospheric pressure for 10 to 90 minutes, this being suitable for products of half an inch to one inch thickness. Alternatively the heating can be carried out for 90 minutes at a pressure of 5 psi.

The steam heating has the effect of imparting a resilient meat like texture to the mass and significantly reduces the bound water and increases the free water of the mass.

On steaming, the gel forming substances, e.g., the egg albumen and the globulin proteins present in the mycelial fungal mass, gel and continue to absorb water. Free water is thought to be taken up preferentially from areas around the hyphae. Water is also thought to pass through holes in the cell walls into the interstices, thus allowing the cell walls to gain close proximity with each other and associate by chemical bonding. This bonding probably occurs via active groups in the glucan and chitin of the cell walls and results in stiffening of the structure and increased textural strength.

If egg albumen or other gel forming substances are not added, the hypahae are still thought to loss water to the interstices and become less turgid, but to a lesser extent.

With increasing time of steaming, globulin proteins of the hyphae and egg albumen begin to denature and the gel binds water less strongly. This is reflected to the progressive change from bound to free water with increased steaming time. For example, between 1 minute and 10 minutes steaming, increases the free water from 46% to 50 % and the bound water falls from 19% to 15%. The change in water state is accompanied by an increase in succulence. Free water is not thought to be reabsorbed by the hyphae and the chemical association of the cell walls and associated stiffening are not reversed. It is to be understood that the steaming does not significantly alter the total water content of the fungal mass, i.e., the solids content of the fungal mass remains at its initial level of from about 20 to about 40% by weight.

Ten to 90 minutes is considered optimum heating times but acceptable texture is obtained up to 2½ hours. At times in excess of 2½ hours, the protein present begins to degrade and denature. Charged groups are released and Maillard sugar protein reactions occur resulting in brown products of pasty texture. The free water content falls rapidly at this point.

The mass formed during heating is then frozen using a plate or a blast freezer to a temperature between −10° C. and −40° C. and preferably to a temperature in the order of −20° C. The freezing must be carried out slowly and a temperature drop of 0.5° C. per minute has proved to be successful. On freezing, there is a further small change in water from the bound state to the free state. This change is of the order of 3% to 8% and occurs gradually over a period of approximately 28 days resulting in a product having a bound water content of between 3% and 25% and more specifically between 7% and 12% by weight. In conjunction with this further decrease in bound water resulting in an increase of free water, there are associated increases in toughening of the texture and also an increase in the succulence of the product. These changes are related to the growth and migration of large ice crystals during freezing and frozen storage, drawing water out of the fibers thus again bringing the hyphae into closer proximity with each other and increasing toughness. At the same time, the increase in free water which has migrated into the interstices, improves the succulence of the product when cooked.

In the process of the invention the heating and freezing steps cause an alteration in the amount of bound and free water but not significantly affect the total amount of water, i.e., the solids content of the fungal mass remains at its initial level of from about 20 to about 40% by weight.

Dependent on the product being simulated, coloring and flavoring may be added prior to the initial texturization step.

One particular example of texturizing in accordance with the invention is as follows.

The following ingredients were mixed for 10 minutes in a standard Hobart mixer.

| Mycelial fungal mass (IMI No. 145425) | 2,000 grams (30% solids content in water) |
|---|---|
| Egg albumen | 150 grams |
| Flavoring | 112½ grams |

After mixing, the resultant mass was texturized by the method described in British Patent Application No. 25387/75.

After the initial texturizing step, the product was steamed in a saturated steam atmosphere at atmospheric pressure for 90 minutes.

The product was then frozen in a blast freezer operating at −20° C.

The resultant frozen product was subsequently coated in batter and crumb and cooked by frying.

We claim:

1. A method of improving the toughness and increasing the succulence of a texturized mycelial fungal mass having a macrofiber structure similar to the fibers of natural meat and having a solids content of from about 20 to about 40% by weight, the solids content of which consists essentially of fungal mycelia, consisting essentially of:
   (a) heating the texturized mass in an atmosphere of substantially saturated steam for a period of from 1–150 minutes so that the entire mass is at a temperature of at least 90° C. to reduce the bound water of the mass by about 4% by weight and increase the free water of the mass by about 4% by weight; and
   (b) freezing the heated, texturized mass slowly at a rate of about 0.5% C. per minute to a temperature between −10° C. and −40° C. to further reduce the amount of bound water and increase the amount of free water of the mass;

said method being conducted so as to maintain the solids content of the fungal mass at its initial level of from about 20 to about 40% by weight throughout said method.

2. The method as claimed in claim 1, in which the heating is carried out for 90 minutes at a pressure of 5 psi.

3. The method as claimed in claim 1, in which the heating is carried out for 10 minutes at atmospheric pressure.

4. The method as claimed in claim 1, in which the freezing is to a temperature of approximately −20° C.

5. The method as claimed in claim 1, in which the freezing produces a change in bound to free water of between 3% to 8% by weight.

* * * * *

UNITED STATES PATENT AND TRADEMARK OFFICE
CERTIFICATE OF CORRECTION

PATENT NO. : 4,341,806
DATED : July 27, 1982
INVENTOR(S) : Bruce Gadsby and Kate A. Simmons It is certified that error appears in the above—identified patent and that said Letters Patent is hereby corrected as shown below:

Column 2, line 44, "produce" should read -- product --.

Column 4, line 13, "hypahae" should read -- hyphae -- and "loss" should read -- lose --.

Column 6, line 10, "0.5%C" should read -- 0.5°C --.

Signed and Sealed this

Twenty-ninth Day of March 1983

[SEAL]

Attest:

GERALD J. MOSSINGHOFF

Attesting Officer

Commissioner of Patents and Trademarks